J. C. HUTTON.
SMOKE HOUSE.
APPLICATION FILED AUG. 23, 1912.
1,052,255.
Patented Feb. 4, 1913.
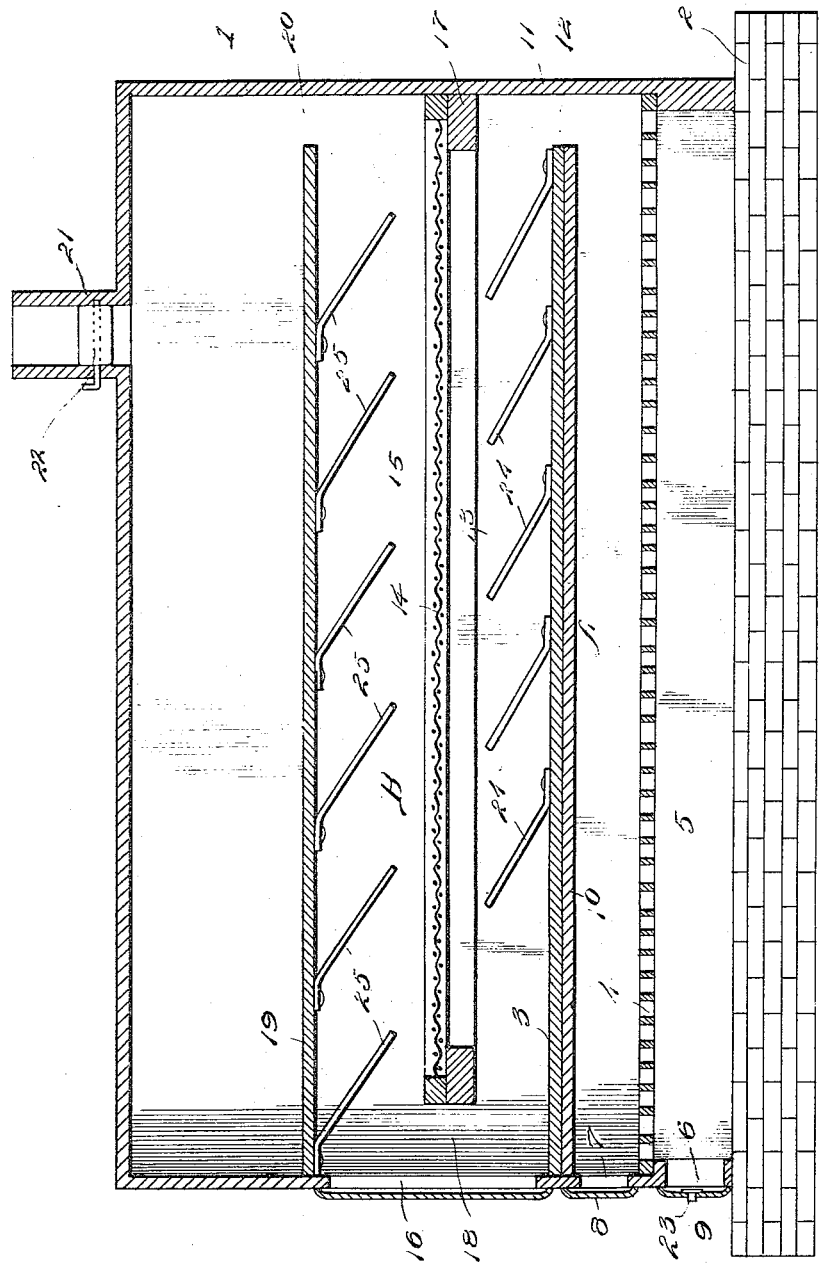
Inventor
J. C. Hutton.
Witnesses
By Victor J. Evans
Attorney

UNITED STATES PATENT OFFICE.

JAMES C. HUTTON, OF SPRINGFIELD, SOUTH DAKOTA.

SMOKE-HOUSE.

1,052,255.                    Specification of Letters Patent.         Patented Feb. 4, 1913.

Application filed August 28, 1912. Serial No. 717,610.

*To all whom it may concern:*

Be it known that I, JAMES C. HUTTON, a citizen of the United States, residing at Springfield, in the county of Bonhomme and State of South Dakota, have invented new and useful Improvements in Smoke-Houses, of which the following is a specification.

This invention relates to smoke houses and particularly to houses for smoking seed corn or the like.

An object of the invention is to provide means for maximizing the area over which the smoke is adapted to travel in the presence of the seed whereby to thoroughly subject the seed to and to cause the same to be effectually commingled with the smoke gases.

Another object of the invention is to provide means whereby the seed can be readily placed in or removed from the house.

In the drawing forming a portion of this application, the figure represents a longitudinal section through the smoke house.

The casing 1 of the smoke house herein shown may be built upon a suitable masonry foundation 2 so as to add to the durability of the structure as shown. A crown sheet or baffle 3 is disposed above the bottom of the house, being suitably spaced therefrom to accommodate a suitable fire grate 4 and to allow for the formation beneath the grate of an ash pit 5, the latter being disposed in line with a suitable clean-out opening 6 in the front wall of the house. An opening 7 is also formed in the front wall of the house and disposed above the plane of the opening 6 whereby material to be fed to the grate can be readily introduced thereto. The opening 7 is closed by a door 8 while the ash pit opening 6 is covered by a door 9. The baffle 3 is provided on its underside with a refractory lining 10 whereby the baffle is rendered fire proof. At one end the baffle is spaced from the rear wall 11 of the house so as to define therewith a feed passage 12 to permit the smoke to discharge into the space 13 between the baffle 3 and the foraminous seed support 14. The seed support is secured in a suitable frame 15 and slidably mounted upon the side walls of the house whereby it can be readily drawn into or out of the door way 16 in the front wall of the house to permit the treated seed to be conveniently removed and to facilitate the introduction of the seed to be treated. At 17 the frame of the seed support is in contact with the wall 11 of the house while at the opposite end the frame is spaced from the front wall of the house so as to define therewith a passage 18. At a point above the seed support and rigidly mounted within the house 1 is a second baffle 19 which is spaced at 20 from the wall 11 as shown.

A stack 21 leads from the top of the house and adjustably mounted therein is a suitable draft regulating damper 22. A regulating damper 23 is also mounted in the door 9 of the ash pit opening, the latter being adapted to coöperate with the former to encourage sufficient draft in the ash pit to promote combustion and to insure a thorough circulation of the smoke gases throughout the house.

The baffle 3 supports deflecting members 24 which are angularly disposed with relation to the baffle and which extend in the direction of the seed support, being terminally spaced from the latter as shown. Deflecting members 25 extend downwardly and rearwardly from the top baffle 19 and are spaced from the seed support as illustrated.

The apparatus is principally intended to be used in treating seeds and to coat the same with a gaseous element so as to prevent them from being eaten by squirrels or other ground rooting animals after the seed is planted. Corn cobs, corn husks, brush, oil or the like may be burned in the furnace chamber A of the apparatus and from the relative arrangement of the companion parts of the structure it is evident that the smoke gases will circulate in the manner indicated by the arrows, said gases first finding escape by way of the passage 12 where it is permitted to travel in the space 13 directly beneath the foraminous seed support, the baffles 24 serving to deflect the smoke in a direction whereby it will pass through the seed support to be effectually commingled with the seed. Some of the smoke gases will continue throughout the space 13 where it will find access to the space B by way of the passage 18. The gases then take a course above the plane of the seed support and they are deflected down against the upper layer of seeds by means of the deflecting members 25. The waste gases finally escape to the stack 21 by way of the passage 20. In this manner the seed is thoroughly treated to the action of the gases in the minimum period of time and with a minimum expenditure of fuel.

I claim:—

1. A smoke house having a furnace chamber, a baffle disposed above the chamber and spaced at one end from an adjacent portion of the house, a second baffle disposed above the first baffle and having one end spaced from an adjacent portion of the house and a seed support disposed between the baffles and having a portion disposed in a direct line with the space between the baffles and the said adjacent portions of the house whereby smoke passing from the furnace chamber will be compelled to travel first below the seed support and then above the same.

2. A smoke house provided with a foraminous seed support and a furnace chamber, a baffle located below said support, a baffle located above the support, deflecting means carried by the first baffle and extending forwardly therefrom and in the direction of the underside of the support, and deflecting members carried by the second baffle and extending rearwardly therefrom and in the direction of the upper surface of the seed support.

3. A smoke house having a furnace chamber and a door opening, a door closing the opening, a seed support slidably mounted in the house and adapted to be moved through said opening, and baffles located within the house and disposed respectively above and below the seed support whereby gases discharging from the furnace will be permitted to circulate above and below and through the seed support.

In testimony whereof I affix my signature in presence of two witnesses.

JAMES C. HUTTON.

Witnesses:
C. L. HILL,
VINTA B. NASH.